(12) United States Patent
Strohaber

(10) Patent No.: US 10,007,044 B2
(45) Date of Patent: Jun. 26, 2018

(54) OPTICAL SYSTEM FOR PRECISION CONTROL OF AN ELECTRIC FIELD WITHIN THE FOCUS OF A LASER BEAM

(71) Applicant: Florida A&M University, Tallahassee, FL (US)

(72) Inventor: James Strohaber, Tallahassee, FL (US)

(73) Assignee: Florida A&M University, Tallahassee, FL (US)

( * ) Notice: Subject to any disclaimer, the term of this patent is extended or adjusted under 35 U.S.C. 154(b) by 210 days.

(21) Appl. No.: 14/748,397

(22) Filed: Jun. 24, 2015

(65) Prior Publication Data
US 2016/0377779 A1 Dec. 29, 2016

(51) Int. Cl.
*G02B 5/30* (2006.01)
*G02F 1/13363* (2006.01)

(52) U.S. Cl.
CPC ......... *G02B 5/3083* (2013.01); *G02B 5/3016* (2013.01); *G02F 1/13363* (2013.01); *G02F 2001/133633* (2013.01); *G02F 2001/133638* (2013.01)

(58) Field of Classification Search
CPC .... G02B 5/3016; G02B 5/3083; G02F 1/3363
USPC ......... 359/253, 256, 489.01, 489.07, 489.16, 359/900
See application file for complete search history.

(56) References Cited

U.S. PATENT DOCUMENTS

| | | | | |
|---|---|---|---|---|
| 3,588,224 A | * | 6/1971 | Pritchard | ................. H04N 9/07 348/291 |
| 4,461,543 A | * | 7/1984 | McMahon | ............ G02F 1/1326 349/196 |
| 4,575,193 A | * | 3/1986 | Greivenkamp, Jr. | ...................... G02B 5/3083 348/336 |
| 5,267,078 A | * | 11/1993 | Shiraishi | ................. G02F 1/093 359/282 |
| 6,236,506 B1 | * | 5/2001 | Cao | ...................... G02B 5/3083 359/484.05 |
| 6,480,331 B1 | * | 11/2002 | Cao | ...................... G02B 5/3083 359/281 |

(Continued)

OTHER PUBLICATIONS

D. Pentlehner, et al., "Impulsive Laser Induced Alignment of Molecules Dissolved in Helium Nanodroplets," PRL. 110, 093002 (2013).

(Continued)

*Primary Examiner* — Ricky D Shafer
(74) *Attorney, Agent, or Firm* — Thomas | Horstemeyer, LLP

(57) ABSTRACT

Disclosed are various implementations for controlling an electric field within a focused beam of electromagnetic radiation. In one example, among others, a system includes a first birefringent element encodes a first phase shift on a vertical component of a polarization of an input beam. A first wave plate rotates a polarization of an output beam of the first birefringent element by an angle. A second birefringent element encodes a second phase shift to a vertical component of the output beam of the first wave plate. A second wave plate rotates a polarization of the output beam of the second birefringent element by another angle. By mechanically or electronically varying parameters of the system, the polarization in the focus of the beam can be continuously orientated in any desired direction.

14 Claims, 3 Drawing Sheets

(56) References Cited

U.S. PATENT DOCUMENTS

| | | | |
|---|---|---|---|
| 6,711,311 B2* | 3/2004 | Delisle | G02B 6/12004 385/11 |
| 6,762,879 B1* | 7/2004 | Li | G02B 27/283 359/282 |
| 7,081,996 B2* | 7/2006 | Wills | G02B 6/272 359/484.03 |
| 2004/0184148 A1* | 9/2004 | Chang | G02B 6/12007 359/484.03 |
| 2015/0277128 A1* | 10/2015 | Johnson | G02B 27/0905 359/489.08 |

OTHER PUBLICATIONS

C. Hnatovshy, et al., "The role of light-induced nanostructures in femtosecond laser micromachining with vector and scalar pulses," Opt. Express. 21, 12651 (2013).

C. Hnatovshy, et al., "Polarization-dependent ablation of silicon using tightly focused femtosecond laser vortex pulses," Opt. Lett. 37, 226 (2012).

J. Strohaber, "Frame dragging with optical vortices," Gen. Relat. Gravit. 45, 2457 (2013).

J. Strohaber, G Kaya, N Kaya, N Hart, A A Kolomenskii, G G. Paulus, H A Schuessler, "In situ tomography of femtosecond optical beams with a holographic knife-edge," Opt. Express 19, 14321 (2011).

\* cited by examiner

OPTICAL SYSTEM FOR PRECISION CONTROL OF AN ELECTRIC FIELD WITHIN THE FOCUS OF A LASER BEAM

BACKGROUND

The interaction of matter with coherent forms of radiation, from lasers, has proved to be a useful method in the investigation of fundamental physics governing the photodynamics of light-matter interactions. Typical experiments can include the interaction of light with matter in the gas phase or in the solid phase. In gas phase experiments, measurements of laser ionization and dissociation rates for molecular systems can depend on the orientation of the molecular axis with respect to the polarization direction. Knowledge gained from these fundamental investigations can provide a means for the coherent control of chemical reactions and dissociation pathways.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAIL DESCRIPTION

Figure 1:
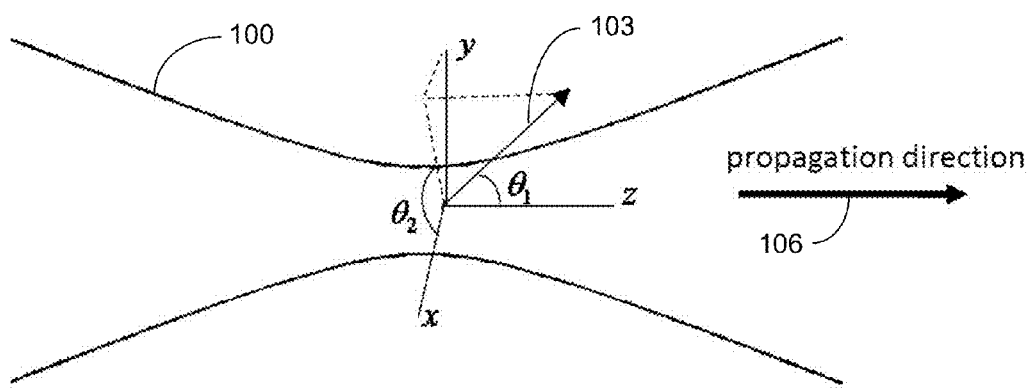
FIG. 1 illustrates an example of a focused laser beam, according to various embodiments of the present disclosure.

Disclosed herein are various embodiments of an optical system configured for precision control of an electric field within the focus of a laser beam. References will now be made in detail to the description of the embodiments as illustrated in the drawings.

Currently, there is much interest in understanding the fundamental physics governing the interaction of ultrashort pulses of radiation with matter. In particular, when atomic systems interact with laser radiation the ionization is isotropic and independent of the polarization direction of the laser radiation. Molecular systems are in general not spherical and have an anisotropic polarization. For this reason, ionization and dissociation can depend on the angle between the molecular axis and the polarization direction of the radiation pulse. While molecular alignment has been investigated, the spatial alignment of the principle axis in the lab frame has been limited to a plane perpendicular to the propagation direction. In addition, micro and nano machining research based on laser ablation with optical beam modes has demonstrated that different milling techniques, such as precision hole and channel drilling, utilize different beam shapes and polarization states. Currently, a continuous method to convert between these modes of operation does not exist.

Various embodiments of the present disclosure may offer advantages in adiabatic or impulsive alignment of molecular systems in the gas phase for the precision measurement. The various embodiments of the present disclosure have equal importance in applications involving micro and nano laser machining. In the solid phase, laser ablation can be important in laser-induced breakdown spectroscopy and in laser machining. In some embodiments, optical systems can utilize passive and/or active optical elements to produce a beam of light that is a superposition of a linear polarized beam and a radially polarized beam. By mechanically or electronically varying parameters of the device, the polarization in the focus of the beam can be continuously orientated in any desired direction.

In particular, optical techniques can be used to spatially modify coherent or incoherent radiation by using passive and/or active optical methods to produce a beam of electromagnetic radiation in which the electric field vector can be fully or partially oriented in any spatial direction relative to the propagation direction. The polarization of the modified radiation can be used to align molecules in any given spatial direction and to continuously vary polarization for micro and nano laser machining applications.

Referring to FIG. 1, shown is an example of an electric field vector (103) of a focused laser beam (106). In this non-limiting example, the smallest size is the waist of the beam (106), which can be referenced to position z=0. The propagation direction of the beam (106) is from the left to the right (as indicated by arrow 109) and is along the z-axis. The x-axis extends out of the page and the y-axis extends vertically. The electric field vector (103), which is shown at the center of the focus, can be positioned at any angle with respect to the propagation direction $\theta_1$ and in the plane perpendicular to the propagation direction $\theta_2$.

To produce a beam (106) of electromagnetic radiation (e.g. a laser beam) with a component of polarization along the direction of propagation, the superposition of beam components with mutually perpendicular polarizations can be used. For example, an even and odd Laguerre-Gaussian beam with mutually perpendicular polarizations can be described by:

$$|RP\rangle = LG_{0,l}^{e}|H\rangle + LG_{0,l}^{o}|V\rangle. \tag{1}$$

Here, $|RP\rangle$ is defined as the radial polarization, and $|H\rangle$ and $|V\rangle$ are standard notations for the horizontal and vertical polarization, respectively. As can be seen above, the radial polarized beam (106) described by Equation 1 does not include a longitudinal component $|k\rangle$ to the polarization.

The function $LG_{0,l}^{(e,o)}$ provides a solution to the scalar paraxial wave equation in cylindrical polar coordinates obtained by separation of variables, as shown below:

$$LG_{0,l}^{(e,o)} = \frac{w_0}{w}\left(\frac{\sqrt{2}\,r}{w}\right)^{|l|}\exp\left(-\frac{r^2}{w^2} - i\frac{kr^2}{2R}\right)e^{-i(|l|+1)\Psi_G}e^{i(kz-\omega t)}(\cos(\theta), \sin(\theta)). \tag{2}$$

Here $\Psi_G = \arctan(z/z_0)$ is the Gouy phase, $w = w_0\sqrt{1+z^2/z_0^2}$ is the beam spot size and $R = z + z_0^2/z$ is the radius of curvature. Equation 2 may be simplified by rewriting it as the product of two functions $LG_{0,l}^{e} = A(r,z)\cos(\theta)$ and $LG_{0,l}^{o} = A(r,z)\sin(\theta)$, where $A(r,z)$ is the pre-factor of $\cos(\theta)$ and $\sin(\theta)$ in Equation 2. To arrive at this result, Equation 2 needs to satisfy the Maxwell equations. By setting the magnitude of the components of the vector potential to be equal to Equation 2 and inserting the results into the Maxwell equations, the electric field vector can be found to be:

$$\vec{E} = E_0 \left[ i(\alpha \hat{e}_x + \beta \hat{e}_y)\psi - \frac{1}{k}\left( \alpha \frac{\partial \psi}{\partial x} + \beta \frac{\partial \psi}{\partial y} \right) \hat{e}_z \right]. \quad (3)$$

Here, $\psi$ can be any paraxial beam mode such as the Hermite-Gaussian (HG), Laguerre-Gaussian (LG), or Ince-Gaussian (IG) beams; and $\alpha$ and $\beta$ are polarization parameters such that when $\alpha=1$ and $\beta=0$ (or when $\alpha=0$ and $\beta=1$) the beam is horizontally (or vertically) polarized. Using the result of Equation 3, the polarization state given in Equation 1 can be rewritten as:

$$|RP\rangle_{z<z_0} = A|RP\rangle_\infty - \frac{1}{k}\left( \frac{\partial A}{\partial r} + \frac{A}{r} \right)|k\rangle, \quad (4)$$

where $|RP\rangle_\infty = \cos(\theta)|H\rangle + \sin(\theta)|V\rangle$. The subscript $\infty$ signifies a polarization that is the same as that found far outside the focus and subscript $z<z_0$ signifies that this is the beam inside the focus, where $z_0 = \pi w_0^2/\lambda$ is the Rayleigh range. The amplitude $A(r,z)$ can have a doughnut-shaped amplitude profile and therefore can have zero intensity along the optical axis of the beam. Close to the optical axis of the beam, Equation 4 can be approximated by:

$$|RP\rangle_{z<z_0} \approx A(r,z)|RP\rangle_\infty - \frac{2}{k}\frac{A(r,z)}{r}|k\rangle. \quad (5)$$

The z-component of the polarization can have a Gaussian shape with a transverse length equal in size to the waist $w_0$ of the focus, and its extent along the propagation direction is approximately equal to the Rayleigh range ($\sim z_0$) similar to that found for a Gaussian beam. The first term of Equation 5 has a doughnut-shaped intensity profile with a central hole size of roughly $w_0\sqrt{1/2}$. Along the optical axis r=0, the polarization vector in Equation 5 is proportional to only the longitudinal polarization vector component, $|RP\rangle_{z<z_0} \propto |k\rangle$. When this field is combined with a field having a transverse polarization such as that due to a linearly polarized Gaussian beam, the superposition results in a field vector that can be varied over the two angles $\theta_1$ and $\theta_2$ shown in FIG. 1. For a Gaussian beam, the $|k\rangle$ component is negligible compared to that found for radial polarized light and can be neglected.

Figure 2:
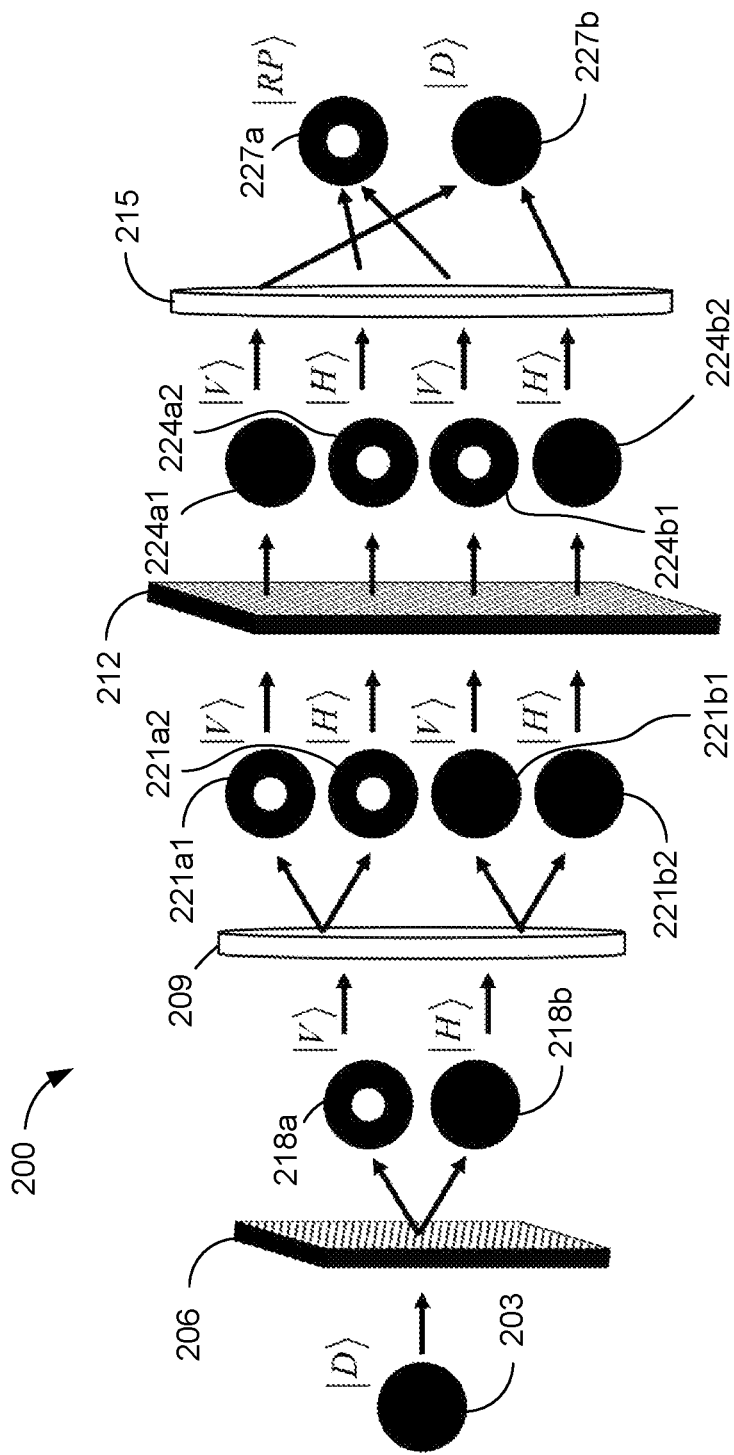
FIG. 2 is graphical representation of an example of an optical system for control of the electric field of a beam, according to various embodiments of the present disclosure.

Referring now to FIG. 2, shown is an example of an optical system (200) comprising a series of optical elements to spatially modify the phase, amplitude and polarization of the input radiation (203). The optical setup can include, for example, a birefringent phase plate, a half-wave plate, and/or a full-wave plate.

As one non-limiting example, the system (200) shown in FIG. 1 uses a series of four optical elements to convert incoming radiation of a laser beam to a beam in which the polarization state can be continuously varied over any angle relative to the propagation direction. The series includes a first optical element (206) that can be a birefringent phase plate, a second optical element (209) that can be a half-wave plate, a third optical element (212) that can be another birefringent phase plate, and a fourth optical element (215) that can be a quarter-wave plate. The birefringent phase plates (206) and (212) can spatially encode phases of $\exp(l_1\theta + \varphi_1)$ and $\exp(l_2\theta + \varphi_2)$, respectively, onto the beam. The half-wave plate (209) can have an angle of rotation of $\beta$ between the fast axis and the x-axis. Polarized light traveling along the fast axis experiences a lower index of refraction and travels faster through an optical element than light projected along the slow axis. The quarter-wave plate (215) can have an angle of rotation of $\gamma$ between the fast axis and the x-axis.

The input beam (203) can impinge on the optical setup from one end and, in the non-limiting example of FIG. 2; it can have a Gaussian beam profile and be diagonally polarized. The first optical element (206) can comprise a parallel aligned liquid crystal device (LCD), which can be either passive or active and/or can be made from birefringent material. The input beam (203) can have a polarization at a 45 degree angle with respect to the alignment of the liquid crystals in the off-state (taken here as vertical). The first optical element (206) (e.g., LCD or other element of similar capabilities) can be designed and/or programmed to produce a sub-beam component (218a) having a spatial phase structure of $e^{i(l_1\theta + \varphi_1)}$ for the component of the input electric field vector along the alignment of the first optical element (206), which is vertical in the example of FIG. 2. The perpendicular sub-beam component (218b), which is horizontal in the example of FIG. 2, is unmodified by the first optical element (206) as is illustrated by the bottom beam component. The phase factor $e^{i(l\theta + \varphi)}$ introduced by the first optical element (206) (e.g., LCD) is typically encountered in beams such as optical vortices and Bessel beams.

In the example of FIG. 2, even though the two resulting sub-beam components (218a and 218b) are shown separately for clarity, the sub-beams (218a and 218b) are spatially superimposed on each other forming the beam passing to the second element (209). All sub-beams shown in the setup of FIG. 2 remain spatially superimposed throughout the system (200) but are shown separately for illustrative purposes. The second element (209) can be a half-wave plate that can be rotated by an angle of $\beta$ around an axis normal to the surface of the element that can be used to rotate the polarization of the two sub-beams (218a and 218b). The angle ($\beta$) of rotation of the wave plate causes a rotation of the polarization that is $2\beta$. When described in terms of parallel (vertical) and perpendicular (horizontal) components, results in four sub-beam components (221a1, 221a2, 221b1 and 221b2). The second element (209) can be either passive (e.g., quartz plate) or active (e.g., a controllable LCD).

The four sub-beams can then be passed through the third element (212), which can be a second liquid crystal device. For this example, its alignment layer is along the vertical. The four sub-beams (221a1, 221a2, 221b1 and 221b2) can each have components of their electric fields along the vertical or horizontal orientation of the first element (206). The third element (212) can add a phase of $e^{i(l_2\theta + \varphi_2)}$ to the components of the electric fields for each sub-beam (221a1 and 221b1) along the parallel direction of the alignment layer (vertical in the example of FIG. 2). The perpendicular (horizontal) sub-beams (221a2 and 221b2) are unaffected by the spatially varying phase of the third element (212). The fourth optical element (215) can be a quarter-wave plate that can be rotated by an angle of $\gamma$ around an axis normal to the surface of the element, or it can be any active or passive device that can be used to change the polarization state of the sub-beams similar to that of a quarter-wave plate (224a1, 224a2, 224b1 and 224b2). Rotation of the ¼ wave plate changes the state of the polarization between linear and circular polarization. In general, the polarization is elliptical. The sub-beams (224a1, 224a2, 224b1 and 224b2) combine to form the output of the optical system (200).

The output beam (227) can be decomposed into a component (227a) that is radially polarized and a component (227b) that is linearly polarized. The radially polarized component (227a), when focused, can produce a longitudinal component $|k\rangle$ of polarization (i.e. along the propagation direction of the beam). This longitudinal component can add to the linear component (perpendicular to the propagation direction 106 of FIG. 1). Because the phases and amplitudes of these two components can be controlled by the optical system (200), the effect can produce an output beam where the polarization can be rotated in space over any angle in three dimensions with the propagation direction acting as the polar axis as shown in FIG. 1.

The operation of the optical system of FIG. 2 will be further described below. The polarization state of the input radiation $|E_1\rangle=|D\rangle$ to the optical system (200) can be linearly polarized along a 45 degrees angle with respect to the x-axis. The Jones matrix for this beam can be mathematically expressed as, $$|E_1\rangle = |D\rangle = \frac{1}{\sqrt{2}}(|H\rangle + |V\rangle). \quad (6)$$

This incoming state can be prepared readily by using, e.g., a half-wave plate prior to the first optical element (206) shown in FIG. 2. The radiation is passed through the first element (206) (e.g., a spatial light modulator or birefringent plate) where the phase structure of the beam (203) is modified. This birefringent element can introduce a constant overall phase and a spatially varying phase modulation of $l_1\theta$. The Jones matrix for the device is given by:

$$M_{SLM_1} = \begin{pmatrix} 1 & 0 \\ 0 & e^{i(l_1\theta+\varphi_i)} \end{pmatrix}. \quad (7)$$

Operation of the first element (206) on the beam (203) in Equation 6 can produce a beam $|E_2\rangle=M_{SLM_1}|E_1\rangle$ encoded with the spatial phase of a Laguerre Gaussian beam:

$$|E_2\rangle = \frac{1}{\sqrt{2}}(|H\rangle + e^{i(l_1\theta+\varphi_i)}|V\rangle). \quad (8)$$

Equation 8 shows that the beam is composed of a horizontally polarized part, and a vertically polarized part having the phase structure of an optical vortex beam. The second optical element (209) can be a half-wave plate with an arbitrary angle of rotation of β. The Jones matrix for this element can be:

$$M_{\lambda/2}(\beta) = \begin{pmatrix} \cos(2\beta) & \sin(2\beta) \\ \sin(2\beta) & -\cos(2\beta) \end{pmatrix}. \quad (9)$$

The matrix in Equation 9 rotates the components of the input electric field vector and converts the field vector $|E_2\rangle$ given in Equation 8 to:

$$|E_3\rangle = \frac{1}{\sqrt{2}}(\cos(2\beta)|H\rangle + \sin(2\beta)|V\rangle + \\ \sin(2\beta)e^{i(l_1\theta+\varphi_i)}|H\rangle - \cos(2\beta)e^{i(l_1\theta+\varphi_i)}|V\rangle). \quad (10)$$

The third optical element (212) can be a second birefringent device (e.g., a spatial light modulator or birefringent plate) which can add an additional constant and spatially varying phase of $\varphi_2$ and $l_2\theta$ respectively to the sub beams. This can be described by the same Jones matrix given in Equation 7 with $l_2\theta$ and $\varphi_2$ replacing $l_1\theta$ and $\varphi_1$. The electric field of the radiation following this element is found to be:

$$|E_4\rangle = \cos(2\beta)(|H\rangle - e^{i(\varphi_1+\varphi_2)}|V\rangle) + \\ \sin(2\beta)(e^{i(-l_2\theta+\varphi_2)}|V\rangle + e^{i(l_1\theta+\varphi_1)}|H\rangle). \quad (11)$$

The last optical element (215) can be a quarter-wave plate whose action on the electric field is given by:

$$M_{\lambda/4}(\gamma) = \begin{pmatrix} \cos^2(\gamma) + i\sin^2(\gamma) & (1-i)\cos(\gamma)\sin(\gamma) \\ (1-i)\cos(\gamma)\sin(\gamma) & \sin^2(\gamma) + i\cos^2(\gamma) \end{pmatrix}. \quad (12)$$

Here, γ is the angle of rotation of the wave plate with respect to the x-axis. Taking $\gamma=\pi/4$, $\varphi_1=\pi/4$ and $\varphi_2=3\pi/4$, the output radiation is therefore:

$$|E_5\rangle = \cos(2\beta)(|H\rangle + |V\rangle) + i\sin(2\beta)(e^{il_1\theta}|R\rangle + e^{il_2\theta}|L\rangle). \quad (13)$$

The first term can be rewritten using the definition of diagonal polarized light and for the case when $l_1=-l_2=l$ the second term is that of radially polarized light and therefore Equation 13 can more succinctly be written as:

$$|E_5\rangle = \cos(2\beta)|D\rangle_\infty + i\sin(2\beta)|RP\rangle_\infty. \quad (14)$$

The subscript ∞ can denote that the field given in Equation 14 is the field of the beam outside the focus. From Equations 4 and 5, it was shown that radially polarized radiation produces a significant longitudinal component of the electric field within the focus. Going from outside the focus to inside the focus, the Gaussian part $|D\rangle_\infty$ in Equation 14 acquires a phase of $e^{i\pi/2}$, while the radially polarized part $|RP\rangle_\infty$ acquires a phase of $e^{i(|l|+1)\pi/2}$; therefore, up to an overall phase, the output radiation of the device in the focus produces an electric field vector of:

$$|E_5\rangle_{z=0} = \cos(2\beta)|D\rangle_{z=0} + i\sin(2\beta)e^{i|l|\pi/2}|RP\rangle_{z=0}. \quad (15)$$

Equation 15 can represent the electric field amplitude at z=0 in the focus. It is the superposition of two beams with one having linear transverse polarization and the other having longitudinal polarization. The amplitude of the linear polarized part can be determined by $\cos(2\beta)$ and the amplitude of the longitudinal part can be controlled by $\sin(2\beta)$. In this way, changing the angle β of the half-wave plate can continuously rotate the polarization from perpendicular to the longitudinal. To rotate the polarization in the plane perpendicular to the propagation direction, a half-wave plate (or similar device) can be positioned before one of the claimed embodiments and both the claimed embodiment and the wave plate can be rotated together.

Figure 3:
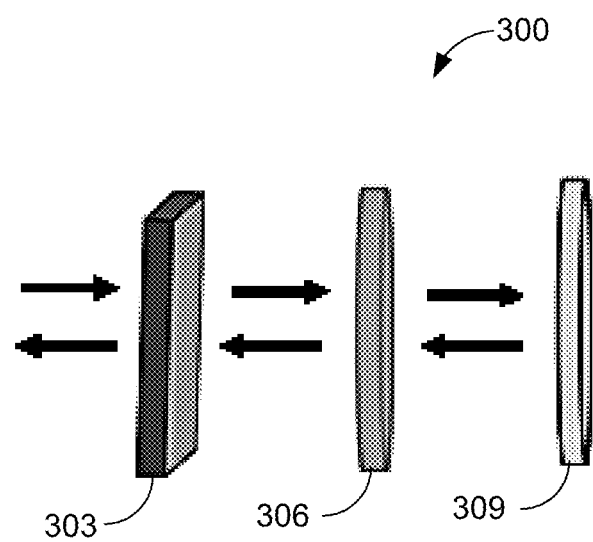
FIG. 3 is graphical representation of an example of a folded optical system for control of the electric field of a beam, according to various embodiments of the present disclosure.

While FIG. 2 discloses an example of an optical system (200) for precision control of the electric field of a beam, other embodiments are possible. For example, other embodiments can include, but is not limited to, folded setups and setups which use equivalent optical elements. Referring to FIG. 3, shown is an example of a folded optical system (300) comprising a series of optical elements such as a spatial light modulator (303), a wave plate element (306), and a folding optics element (309). Other optical elements can also be included in the folded optical system (300) before and/or after the spatial light modulator (303).

The folded optical system (300) can be derived from optical system (200) of FIG. 2. For example, elements (303) and (306) can be similar in function to elements (206) and (209) shown in FIG. 2. Element (309) can be a folding mirror (or similar optical element) used to send or redirect the beam back though elements (306) and (303). Here, equivalent optical elements include any optical element(s) which can be used to substitute for one, multiple, or all elements. As illustrated in FIG. 3, a spatial light modulator (303) can spatially encode a phase on a sub-beam component of the input beam and the wave plate element (306) can rotated the sub-beam components by a defined angle of rotation between the fast axis and the slow axis. The folding optics element (309) returns the beam back to the wave plate element (306) which again rotates the sub-beam components by a defined angle of rotation and the spatial light modulator (303) spatially encodes a phase on a portion of the sub-beam component. Because the beam reflected by the folding optics element 309 passes through the wave plate element twice, a quarter-wave plate can be used as the wave plate element (306) to produce the same effect as the half-wave plate of the second optical element (209) of FIG. 2. Similar to the third optical element (212) of FIG. 2, the spatial light modulator (303) spatially encodes phases on the sub-beam components. The sub-beam components exiting the spatial light modulator (303) can form the output beam as discussed with respect to FIG. 2. These elements also include additional elements which add aspects leading to the end function of the proposed device such as, e.g., steering mirrors or compensating elements. For example, a beam splitter or other suitable element may be used to redirect the output beam from the spatial light modulator (303) to another optical element (e.g., a quarter-wave plate) to form the radially polarized component (227a of FIG. 2) and the linearly polarized component (227b of FIG. 2) of the output beam.

The elements of the folded optical system (300) can be spaced with any separation and may even be combined as one single unit. All optical materials may have a frequency response (i.e. wavelength dependence), and for this reason, various embodiments of the present disclosure be made or designed to cover any wavelength range. The various embodiments and the corresponding elements also include narrowband and broadband light, coherent and non-coherent light, and continuous wave and pulsed radiation. As an example, the operation of one embodiment can be used with pulsed broadband radiation in which specialized materials may be needed to handle high powers and intensities, and compensating elements or setups such as achromatic wave plates may be needed for broadband operation.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. An apparatus, comprising:
a first birefringent element configured to provide a first output beam by encoding a first phase shift to a vertical component of an initial polarization of an input beam of electromagnetic radiation;
a first wave plate configured to provide a second output beam by rotating a polarization of the first output beam by a first angle, wherein the polarization is rotated in a two-dimensional plane with respect to a propagation direction of the input beam;
a second birefringent element configured to provide a third output beam by encoding a second phase shift to a vertical component of a polarization of the second output beam;
a second wave plate configured to provide a fourth output beam by changing a polarization of the third output beam by a second angle; and
wherein a polarization of the fourth output beam is configured to rotate in a third dimension by rotating the apparatus in a plane perpendicular to the two-dimensional plane.

2. The apparatus of claim 1, wherein the initial polarization comprises a polarization of 45 degrees with respect to an alignment of the first birefringent element.

3. The apparatus of claim 1, wherein the first wave plate is a half-wave plate.

4. The apparatus of claim 1, wherein the second wave plate is a quarter-wave plate.

5. The apparatus of claim 1, wherein the first birefringent element comprises a passive liquid crystal device configured to provide the first phase shift.

6. An apparatus, comprising:
a first optical element configured to provide a first output beam by adding a first phase shift to a vertical component of an initial polarization of a beam of electromagnetic radiation, the vertical component being aligned with an axis of the first optical element;
a second optical element configured to provide a second output beam by rotating a polarization of the first output beam by a first angle, wherein the polarization is rotated in a two-dimensional plane with respect to a propagation direction of the beam;
a third optical element configured to provide a third output beam by adding a second phase shift to a vertical component of a polarization of the second output beam, the vertical component of the second output beam being aligned with an axis of the third optical element;
a fourth optical element configured to provide a fourth output beam by changing a polarization of the third output beam by a second angle, the fourth output beam comprising a radially polarized component and a linearly polarized component; and
wherein a polarization of the fourth output beam is configured to rotate in a third dimension by rotating the apparatus in a plane perpendicular to the two-dimensional plane.

7. The apparatus of claim 6, wherein the first optical element is a spatial light modulator.

8. The apparatus of claim 6, wherein the initial polarization comprises a polarization of 45 degrees with respect to an alignment of the first optical element.

9. The apparatus of claim 8, wherein the polarization of 45 degrees is configured by a half-wave plate.

10. The apparatus of claim 6, wherein the first optical element comprises an active liquid crystal device programmed to provide the first phase shift.

11. The apparatus of claim 6, wherein the second optical element comprises at least one of the following: a half-wave plate, a passive quartz plate, or an active controllable liquid crystal device.

12. The apparatus of claim 6, wherein the fourth optical element comprises a quarter-wave plate.

13. The apparatus of claim 6, wherein the polarization of the fourth output beam is configured to align a plurality of molecules in a predefined direction.

14. A method of controlling an electric field within a focus of a beam of electromagnetic radiation for an optical system, comprising:
- encoding, via a birefringent element, a phase shift to a vertical component of an initial polarization of a beam of electromagnetic radiation to produce a first output beam;
- rotating, via a wave plate, a polarization of the first output beam by an angle to produce a second output beam, wherein the polarization is rotated in a two-dimensional plane with respect to a propagation direction of the beam;
- encoding, via a second birefringent element, a second phase shift to a vertical component of a polarization of the second output beam to produce a third output beam;
- changing, via a second waveplate, a polarization of the third output beam by a second angle to produce a fourth output beam; and
- rotating a polarization of the fourth output beam in a third dimension by rotating the optical system in a plane perpendicular to the two-dimensional plane.

* * * * *